(12) United States Patent
Lee et al.

(10) Patent No.: US 10,759,283 B2
(45) Date of Patent: Sep. 1, 2020

(54) BATTERY PACK AND VEHICLE COMPRISING BATTERY PACK

(71) Applicant: LG CHEM, LTD., Seoul (KR)

(72) Inventors: Kang-Gu Lee, Daejeon (KR);
Sung-Dae Kim, Daejeon (KR);
Young-Hoo Oh, Daejeon (KR);
Jae-Hun Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 167 days.

(21) Appl. No.: 15/763,767

(22) PCT Filed: Dec. 9, 2016

(86) PCT No.: PCT/KR2016/014424
§ 371 (c)(1),
(2) Date: Mar. 27, 2018

(87) PCT Pub. No.: WO2017/099507
PCT Pub. Date: Jun. 15, 2017

(65) Prior Publication Data
US 2018/0269440 A1 Sep. 20, 2018

(30) Foreign Application Priority Data

Dec. 9, 2015 (KR) .......................... 10-2015-0175017

(51) Int. Cl.
*H01M 2/10* (2006.01)
*H01M 10/42* (2006.01)
(Continued)

(52) U.S. Cl.
CPC ............... *B60L 50/64* (2019.02); *H01M 2/10* (2013.01); *H01M 2/1072* (2013.01);
(Continued)

(58) Field of Classification Search
CPC .............. H01M 2/1072–1083; H01M 2/1094
See application file for complete search history.

(56) References Cited

U.S. PATENT DOCUMENTS 3,446,906 A * 5/1969 Zulauf ..................... H05K 9/00
174/383
4,732,826 A * 3/1988 Hardigg .............. H01M 2/0237
429/176
(Continued)

FOREIGN PATENT DOCUMENTS

CN 103270643 A 8/2013
DE 102008059948 A1 6/2010
(Continued)

OTHER PUBLICATIONS

International Search Report for PCT/KR2016/014424 (PCT/ISA/210) dated Mar. 30, 2017.

*Primary Examiner* — Robert S Carrico
(74) *Attorney, Agent, or Firm* — Birch, Stewart, Kolasch & Birch, LLP

(57) ABSTRACT

Disclosed is a battery pack, which includes a battery module having at least one battery cell, a pack case made of a metal material and configured to package the battery module, and a fire extinguishing liquid guide cover configured to cover one side of the pack case, the fire extinguishing liquid guide cover being melted over a predetermined temperature to form an opening so that a fire extinguishing liquid is guided into the pack case, the fire extinguishing liquid guide cover having a noise shielding member for shielding an electromagnetic noise not to enter the pack case.

16 Claims, 4 Drawing Sheets

(51) Int. Cl.
B60L 50/50 (2019.01)
B60L 50/64 (2019.01)

(52) U.S. Cl.
CPC ......... H01M 2/1094 (2013.01); H01M 10/42 (2013.01); H01M 2220/20 (2013.01); Y02T 10/7005 (2013.01)

(56) References Cited

U.S. PATENT DOCUMENTS

| | | | |
|---|---|---|---|
| 2003/0192715 A1* | 10/2003 | Lambert | H05K 9/0041 |
| | | | 174/355 |
| 2005/0162842 A1 | 7/2005 | Muramatsu et al. | |
| 2013/0264077 A1 | 10/2013 | Jung | |
| 2014/0045006 A1 | 2/2014 | Yoon et al. | |
| 2015/0056481 A1 | 2/2015 | Cohen et al. | |
| 2017/0165513 A1 | 6/2017 | Li | |

FOREIGN PATENT DOCUMENTS

| | | |
|---|---|---|
| JP | 2001-185112 A | 7/2001 |
| KR | 10-2005-0073407 A | 7/2005 |
| KR | 10-2005-0098434 A | 10/2005 |
| KR | 10-2014-0021961 A | 2/2014 |
| KR | 10-2015-0059515 A | 6/2015 |
| WO | WO 2015/120742 A1 | 8/2015 |

* cited by examiner

BATTERY PACK AND VEHICLE COMPRISING BATTERY PACK

TECHNICAL FIELD

The present disclosure relates to a battery pack and a vehicle including the battery pack.

The present application claims priority to Korean Patent Application No. 10-2015-0175017 filed on Dec. 9, 2015 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing energy efficiency and environment friendliness in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

The conventional battery packs generally include at least one battery module and a pack case for packaging the at least one battery module. Here, the pack case is generally made of a metal material such as steel for ensuring rigidity and shielding electromagnetic noise. In addition, an outer surface of the pack case is coated with a nonconductive material such as epoxy for protecting the exterior and preventing corrosion.

However, in the conventional battery pack, since the pack case for packaging the battery module is made of a metal material, when the battery module is ignited due to a fire or overheating of the battery module in the battery pack, a fire extinguishing liquid sprayed from an extinguishing device such as a fire extinguisher to extinguish the ignition may not easily flow into the pack case.

Accordingly, in the conventional battery pack, it is difficult for the fire extinguishing liquid to flow smoothly into the battery module inside the pack case when a fire or overheating occurs at the battery module in the pack case, and thus there is a greater risk of secondary damages, such as an explosion of the battery pack due to the expansion of the battery module or a chain explosion of a vehicle or the like to which the battery pack is mounted.

Therefore, it is requested to find a way to allow a fire extinguishing liquid for fire suppression to smoothly flow into the pack case when a fire or overheating occurs at the battery pack.

DISCLOSURE

Technical Problem

The present disclosure is directed to providing a battery pack which may allow a fire extinguishing liquid for fire suppression to smoothly flow into a pack case when a fire or overheating occurs at the battery pack, and a vehicle including the battery pack.

Technical Solution

In one aspect of the present disclosure, there is provided a battery pack, comprising: a battery module having at least one battery cell; a pack case made of a metal material and configured to package the battery module; and a fire extinguishing liquid guide cover configured to cover one side of the pack case, the fire extinguishing liquid guide cover being melted over a predetermined temperature to form an opening so that a fire extinguishing liquid is guided into the pack case, the fire extinguishing liquid guide cover having a noise shielding member for shielding, an electromagnetic noise not to enter the pack case.

The fire extinguishing liquid guide cover may include a cover plate configured to cover a fire extinguishing liquid guide hole formed at one side of the pack case, and the cover plate may be melted over the predetermined temperature to form the opening so that the fire extinguishing liquid guide hole may be exposed.

The noise shielding member may be provided at a bottom surface of the cover plate and disposed at an upper side of the fire extinguishing liquid guide hole.

The noise shielding member may be made of a metal material and grounded to the pack case.

The noise shielding member may include: a grounding portion configured to surround the fire extinguishing liquid guide hole and grounded to the pack case; and a shielding grid connected to the grounding portion and having a plurality of shielding holes disposed at the upper side of the fire extinguishing liquid guide hole.

At least one ground guide may be provided at the grounding portion to facilitate easier grounding to the pack case.

The ground guide may include a plurality of leaf springs, and the plurality of leaf springs may be disposed at predetermined intervals along a circumferential direction of the grounding portion.

The plurality of shielding holes may have a honeycomb shape.

The noise shielding member may be a conductive sheet.

The cover plate may be made of a plastic material.

The fire extinguishing liquid guide cover may include a sealing member provided along a rim of a bottom surface of the cover plate.

The fire extinguishing liquid guide cover may include a rigid reinforcing rib provided at a bottom surface of the cover plate.

The fire extinguishing liquid guide cover may include a pressure filter mounted to an upper surface of the cover plate to allow an external air to flow in or out depending on the pressure in the pack case.

The predetermined temperature may be at least 100° C.

In addition, the present disclosure provides a vehicle comprising a battery pack according to the above embodiments.

Advantageous Effects

According to various embodiments as above, it is possible to provide a battery pack which may allow a fire extinguishing liquid for fire suppression to smoothly flow into a pack case when a fire or overheating occurs at the battery pack, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
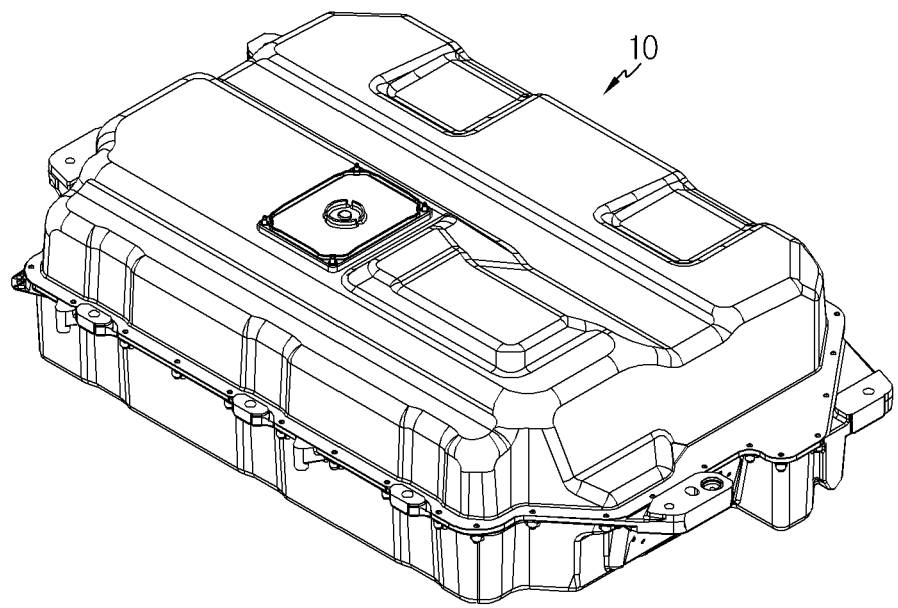
FIG. 1 is a diagram for illustrating a battery pack according to an embodiment of the present disclosure.
Figure 2:
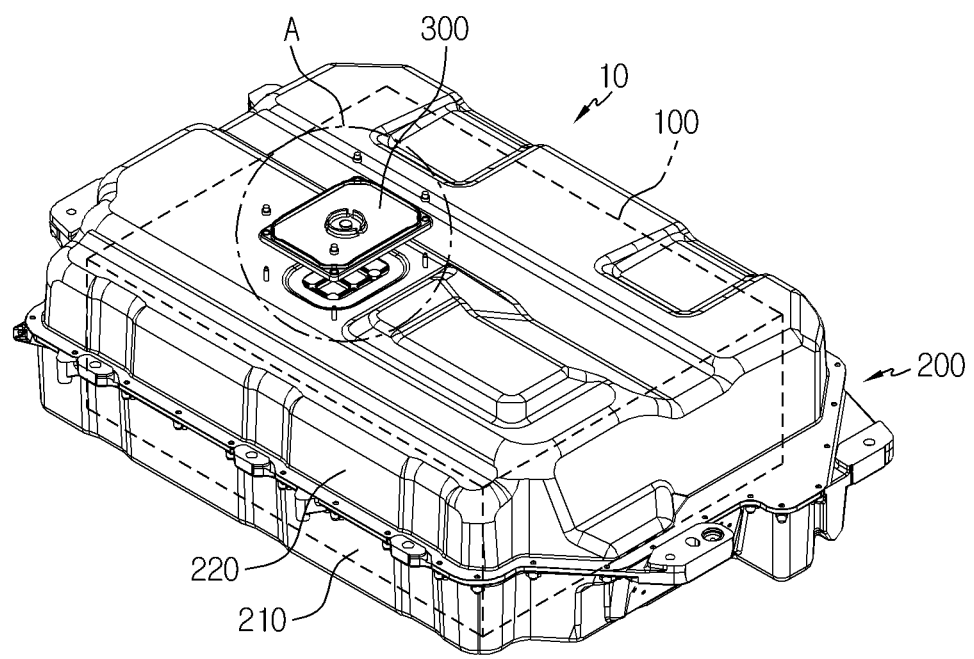
FIG. 2 is an exploded perspective view showing the battery pack of FIG. 1.
Figure 3:
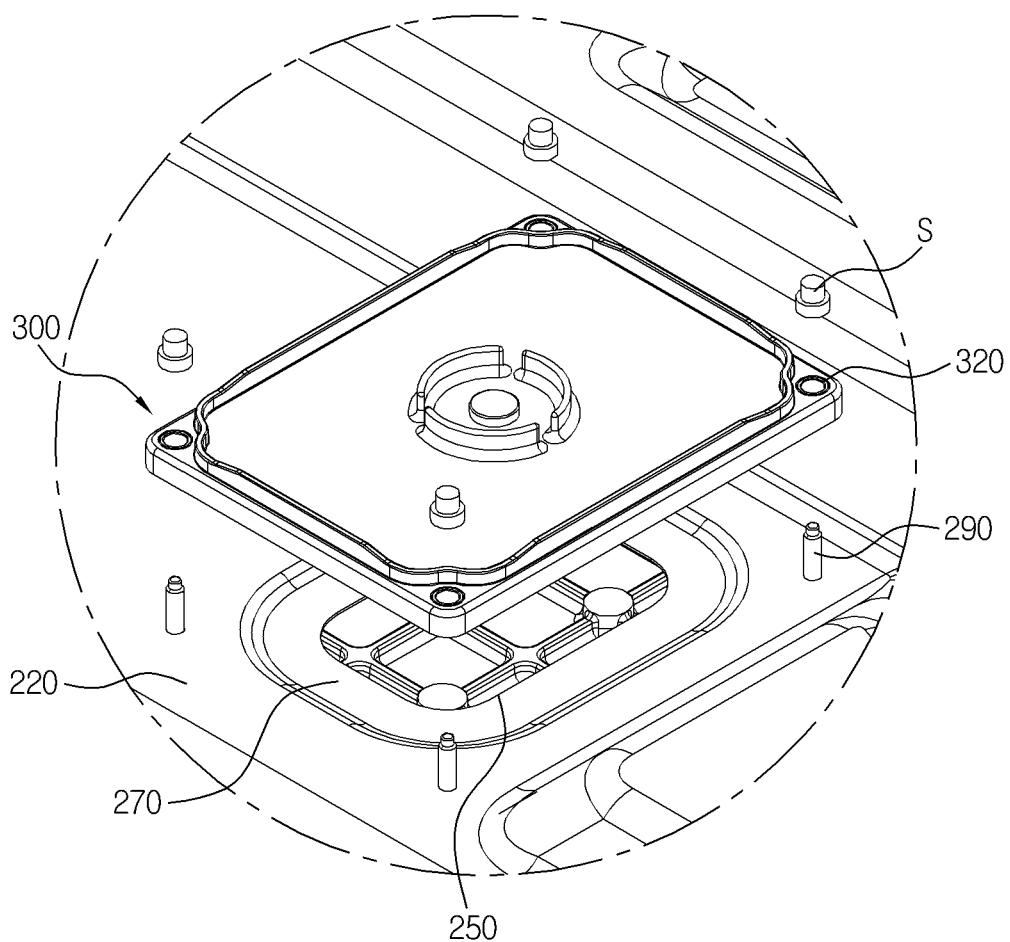
FIG. 3 is an enlarged view showing an A portion of FIG. 2.
Figure 4:
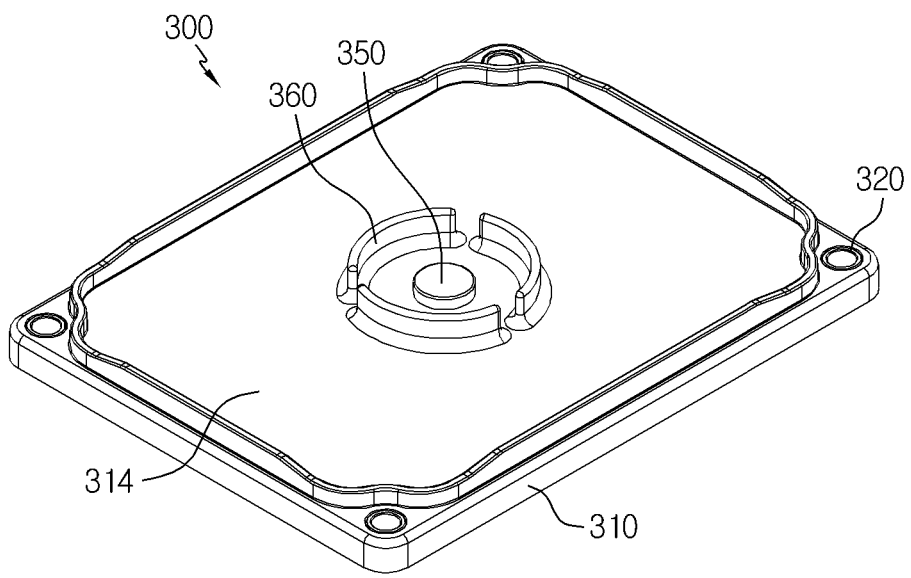
FIGS. 4 and 5 are perspective views showing a fire extinguishing liquid guide cover of the battery pack of FIG. 2.
Figure 5:
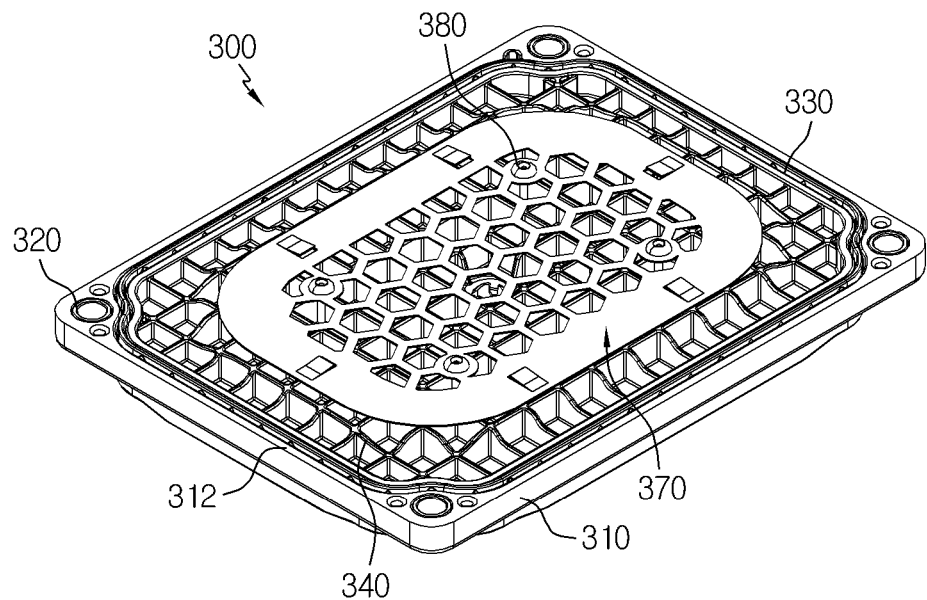
Figure 6:
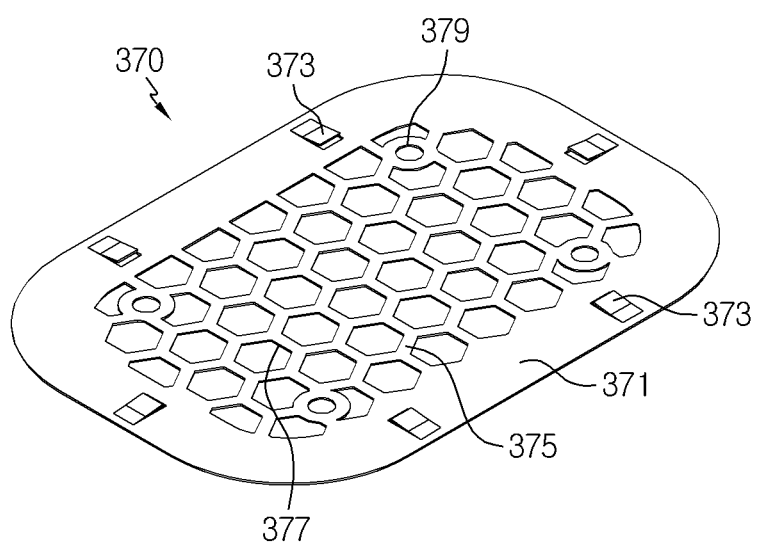
FIG. 6 is a perspective view showing a noise shielding member of the fire extinguishing liquid guide cover of FIG. 5.
Figure 7:
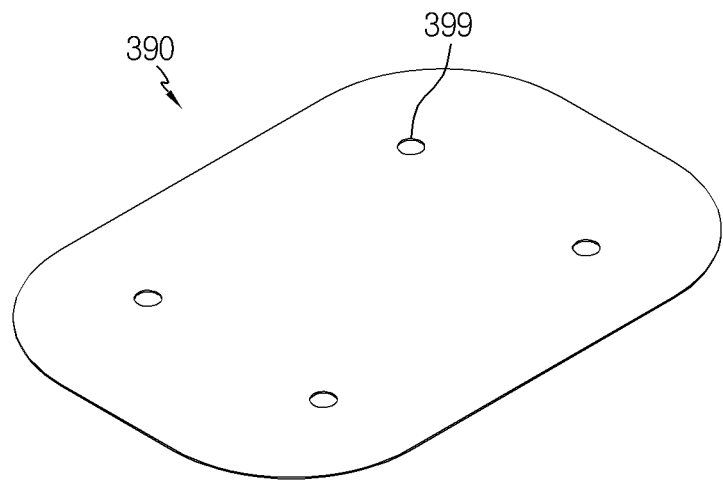
FIG. 7 is a perspective view showing a noise shielding member of the fire extinguishing liquid guide cover of FIG. 5 according to another embodiment.

FIG. 1 is a diagram for illustrating a battery pack according to an embodiment of the present disclosure, FIG. 2 is an exploded perspective view showing the battery pack of FIG. 1, FIG. 3 is an enlarged view showing an A portion of FIG. 2, FIGS. 4 and 5 are perspective views showing a fire extinguishing liquid guide cover of the battery pack of FIG. 2, FIG. 6 is a perspective view showing a noise shielding member of the fire extinguishing liquid guide cover of FIG. 5, and FIG. 7 is a perspective view showing a noise shielding member of the fire extinguishing liquid guide cover of FIG. 5 according to another embodiment.

Referring to FIGS. 1 to 7, a battery pack 10 may be provided to a vehicle as a fuel source of the vehicle. As an example, the battery pack 10 may be provided to an electric vehicle, a hybrid vehicle, a plug-in hybrid vehicle, and various other-type vehicles capable of using the battery pack 10 as a fuel source.

In addition, the battery pack 10 may be provided in other devices, instruments or facilities such as an energy storage system using a battery cell as a secondary battery, in addition to the vehicle.

The battery pack 10 may include a battery module 100, a pack case 200 and a fire extinguishing liquid guide cover 300.

The battery module 100 may be composed of a battery cell assembly having at least one battery cell. The number of battery cells in the battery module 100 may be set variously depending on a demanded output voltage or charging/discharging capacity.

The battery cell may be a pouch-type secondary battery and may be provided in plural so as to be electrically connected to each other. Each battery cell may include an electrode assembly, a battery case for accommodating the electrode assembly and an electrode lead protruding out of the battery case and electrically connected to the electrode assembly.

The electrode lead may include a positive electrode lead and a negative electrode lead, where the positive electrode lead may be connected to a positive electrode plate of the electrode assembly and the negative electrode lead may be connected to a negative electrode plate of the electrode assembly. The battery cell is well known in the art and thus not explained in detail here.

The pack case 200 is used for packaging the battery module 100 and may be made of a metal material such as steel for ensuring rigidity and shielding electromagnetic noise entering the pack case 200. In addition, an outer surface of the pack case 200 may be coated with a nonconductive material such as epoxy for protecting the exterior and preventing corrosion.

The pack case 200 may include a lower case 210, an upper case 220, a fire extinguishing liquid guide hole 250, a ground track 270 and a cover mounting portion 290.

The lower case 210 may accommodate the battery module 100. The lower case 210 may be made of a metal material such as steel and its outer surface may be coated with a nonconductive material such as epoxy.

The upper case 220 may be coupled to the lower case 210 to package the battery module 100. The upper case 220 may also be made of a metal material such as steel, and its outer surface may be coated with a nonconductive material such as epoxy. However, the ground track 270, explained later, formed at the upper case 220 is not coated with a nonconductive material. This will be explained later in detail in association with the ground track 270.

The fire extinguishing liquid guide hole 250 may be formed at one side of the pack case 200, in detail at the upper case 220. The fire extinguishing liquid guide hole 250 may be exposed out when the fire extinguishing liquid guide cover 300 is melted, so that a fire extinguishing liquid is guided to flow into the pack case 200.

The ground track 270 may be provided at the upper case 220 to surround the fire extinguishing liquid guide hole 250. The ground track 270 is not coated with a nonconductive material such as epoxy as described above. Accordingly, the ground track 270 may be made of only a metal material not coated with a nonconductive material.

The ground track 270 may be grounded to a grounding portion 371 of the noise shielding member 370, explained later. The ground track 270 may be grounded to the grounding portion 371 to connect the noise shielding member 370 to the entire pack case 200 as a single metal body in order to maximize the electromagnetic noise shielding effect of the noise shielding member 370, explained later.

The cover mounting portion 290 is provided to the upper case 220 and may be provided in plural. A plurality of coupling members S for mounting the upper case 220 of the fire extinguishing liquid guide cover 300, explained later, may be provided to the plurality of cover mounting portion 290. Here, the plurality of coupling members S may be screwed to the cover mounting portion 290. This is just an example, and the plurality of coupling members S may be mounted in various other ways which may allow the fire extinguishing liquid guide cover 300, explained later, to be mounted the upper case 220.

The fire extinguishing liquid guide cover 300 is mounted to one side of the pack case 200, in detail one side of the upper case 220, and may cover the fire extinguishing liquid guide hole 250 formed at one side of the pack case 200, in detail one side of the upper case 220.

When a fire or overheating occurs at the battery pack 10, the fire extinguishing liquid guide cover 300 is melted over a predetermined temperature to form an opening 305 (see FIG. 8) which exposes the fire extinguishing liquid guide hole 250 to the pack case 200, so that a fire extinguishing liquid 55 injected from an extinguishing device 50 (see FIG. 8) such as an extinguisher for extinguishing, the fire or overheating smoothly flows into the pack case 200. The predetermined temperature is a melting temperature of the fire extinguishing liquid guide cover 300 and may be, for example, 100° C. The fire extinguishing liquid guide cover 300 may be designed to be melted at a suitable temperature.

The fire extinguishing liquid guide cover 300 may include a cover plate 310, a coupling member passing hole 320, a sealing member 330, a rigid reinforcing rib 340, a pressure filter 350, a filter protection wall 360, a noise shielding member 370 and a shield coupling member 380.

The cover plate 310 forms the exterior of the fire extinguishing liquid guide cover 300 and may be mounted to one side of the pack case 200, in detail the upper case 220, to cover the fire extinguishing liquid guide hole 250 formed at the upper case 220.

The cover plate 310 may be melted over the predetermined temperature mentioned above to form the opening 305 so that the fire extinguishing liquid guide hole 250 is exposed. Here, the cover plate 310 may be made of a plastic material for easy melting. Accordingly, since the cover plate 310 is made of a plastic material, different from the pack case 200 made of a metal material, the cover plate 310 may be easily melted when a fire or overheating occurs, different from the pack case 200.

The coupling member passing hole 320 is used for allowing the coupling member S to pass therethrough so as to be mounted to the upper case 220 of the fire extinguishing liquid guide cover 300, and may be provided at a rim of the cover plate 310. The coupling member passing hole 320 may be provided in plural and may be formed at four rim edges of the cover plate 310.

The sealing member 330 is provided at a bottom surface 312 of the cover plate 310 and may seal the upper case 220 of the cover plate 310. The sealing member 330 may be provided along a rim of the bottom surface 312 of the cover plate 310 and be made of a rubber material.

The rigid reinforcing, rib 340 is used for reinforcing rigidity of the cover plate 310 and may be formed at the bottom surface 312 of the cover plate 310. The rigid reinforcing rib 340 may include lattice-type ribs. The rigid reinforcing rib 340 is not limited to this shape but may have various shapes capable of reinforcing rigidity of the cover plate 310.

The pressure filter 350 is used for controlling the pressure in the pack case 200 and may be mounted to an upper surface 314 of the cover plate 310. The pressure filter 350 may allow an external air to flow into or out of the pack case 200 according to the pressure in the pack case 200.

The filter protection wall 360 is used for protecting the pressure filter 350 against external impacts and may be provided at the upper surface 314 of the cover plate 310 to surround the pressure filter 350.

The noise shielding member 370 is used for shielding an electromagnetic noise not to enter the pack case 200 and may be made of a metal material for shielding the electromagnetic noise and grounded to the pack case 200.

By means of the noise shielding member 370, in this embodiment, it is possible to effectively prevent an electromagnetic noise from entering the pack case 200. In detail, in this embodiment, by means of the noise shielding member 370, as shown in Table 1 below, it may be found that the battery pack of the present disclosure passes various EMC tests. In particular, in this embodiment, it may be found that the battery pack of the present disclosure also passes a BCI test (a test of immunity of bulk current injection), among the following electromagnetic wave immunity tests, by means of the noise shielding member 370. In other words, in this embodiment, agreeable results may be obtained in all electromagnetic wave immunity tests, including the BCI test, by means of the noise shielding member 370, compared with the case where the noise shielding member 370 is not provided.

TABLE 1

| | EMC test | Presence of noise shielding member | |
|---|---|---|---|
| | | X | ○ |
| 1 | Immunity to radiated field | Pass | Pass |
| 2 | Immunity to bulk current injection (BCI) | Fail | Pass |
| 3 | Immunity to audio frequency magnetic field | Pass | Pass |
| 4 | Measurement of radio frequency radiated emission | Pass | Pass |
| 5 | Measurement of radio frequency conducted emission | Pass | Pass |
| 6 | Measurement of magnetic field radiated emissions | Pass | Pass |

In Table 1, the immunity test to a radiated field in Test 1 is one of electromagnetic wave immunity tests, and this is an immunity test in which an electromagnetic wave is radiated by an antenna to apply the electromagnetic wave to a test sample. The immunity test (BCI test) to bulk current injection in Test 2 is one of electromagnetic wave immunity tests, and this is an immunity test in which an injection probe through which electric current flows is clamped to a test sample to intentionally apply the electric current. The immunity test to an audio frequency magnetic field in Test 3 is one of electromagnetic wave immunity tests, and this is an immunity test in which a low-frequency magnetic field is applied to a test sample by using a loop antenna. The measurement test of radio frequency radiated emission in Test 4 is one of electromagnetic wave measurement tests, and this is a test in which an electromagnetic wave radiated from a test sample is measured by an antenna. The measurement test of radio frequency conducted emission in Test 5 is one of electromagnetic wave measurement tests, and this is a test in which noise conducted from a test sample is measured. Finally, the measurement test of magnetic field radiated emissions in Test 6 is one of electromagnetic wave measurement tests, and this is a test in which a magnetic field radiated from a test sample is measured. As shown in Table 1, in this embodiment, it is possible to provide the battery pack 10 which satisfies all of the listed EMC tests, by means of the noise shielding member 370.

Meanwhile, the noise shielding member 370 may be made of a metal material with a lower melt point than the pack case 200 so as to be relatively rapid melted when a fire or overheating occurs at the battery pack 10.

The noise shielding member 370 may be provided at the bottom surface 312 of the cover plate 310 and may be disposed at an upper side of the fire extinguishing liquid guide hole 250 to cover the fire extinguishing liquid guide hole 250, when being mounted to the upper case 220 of the cover plate 310.

The noise shielding member 370 may include a grounding portion 371, a shielding grid 375 and a coupling member passing hole 379.

The grounding portion 371 forms a rim of the noise shielding member 370 and may be grounded to the pack case 200. In detail, the grounding portion 371 may be grounded by means of surface contact with the ground track 270 of the upper case 220 of the pack case 200 and may be shaped corresponding to the ground track 270.

The grounding portion 371 may be grounded to the ground track 270 to connect the noise shielding member 370 to the pack case 200 as a single metal body, thereby maximizing the electromagnetic noise shielding effect of the noise shielding member 370.

The grounding portion 371 may include a ground guide 373.

The ground guide 373 is used for facilitating easier grounding with the pack case 200, in detail the ground track 270, and may include a plurality of leaf springs 373.

The plurality of leaf springs 373 may be disposed at predetermined intervals along a circumferential direction of the grounding portion 371 and may press and elastically contact the ground track 270 when the grounding portion 371 and the ground track 270 come into surface contact.

When the grounding portion 371 is mounted by means of the elastic contact, even though a clearance is created due to swelling of the grounding portion 371, the plurality of leaf springs 373 may come into contact with the ground track 270, thereby preventing a grounding fault between the grounding portion 371 and the ground track 270.

The shielding grid 375 is connected to the grounding portion 371 and may be disposed at an upper side of the fire extinguishing liquid guide hole 250. The shielding grid 375 may shield an electromagnetic noise, which may pass through the cover plate 310 made of a plastic material from the outside of the pack case 200, not to enter the fire extinguishing liquid guide hole 250, together with the grounding portion 371.

The shielding grid 375 may include a plurality of shielding holes 377 which are disposed at an upper side of the fire extinguishing liquid guide hole 250 when the fire extinguishing liquid guide cover 300 is mounted.

The plurality of shielding holes 377 may guide a fire extinguishing liquid 55 (see FIG. 8) or the like, which flows in through the melt cover plate 310, to flow into the fire extinguishing liquid guide hole 250, even though the noise shielding member 370 made of a metal material is not melted when a fire or overheating occurs at the battery pack 10.

The plurality of shielding holes 377 may have a honeycomb shape. Without being limited thereto, the plurality of shielding holes 377 may have various other shapes such as a triangular shape, a rectangular shape or a circular shape, as long as the fire extinguishing liquid 55 introduced through the melted cover plate 310 is guided into the fire extinguishing liquid guide hole 250.

The coupling member passing hole 379 is used for allowing the shield coupling member 380, explained later, to pass therethrough when the noise shielding member 370 is mounted to the bottom surface 312 of the cover plate 310 and may be provided at the shielding grid 375. The coupling member passing hole 379 may be provided in single or in plural.

The shield coupling member 380 is used for mounting the noise shielding member 370 to the bottom surface 312 of the cover plate 310 and may be provided in plural. The plurality of shield coupling member 380 may be coupled to the bottom surface 312 of the cover plate 310 by screwing or the like after passing through the plurality of coupling member passing holes 379.

Meanwhile, as shown in FIG. 7, the noise shielding member 390 may also be made of a conductive sheet with a low melting point. The noise shielding member 390 made of such a conductive sheet may have a plurality of coupling member passing holes 399 through which the shield coupling member 380 passes, similar to the noise shielding member 370 described above.

If the noise shielding member 390 is made of a conductive sheet with a low melting point, when a fire or overheating occurs at the battery pack 10, the noise shielding member 390 may be melted similar to the cover plate 310, and thus the fire extinguishing liquid guide hole 250 may be exposed out of the pack case 200 so that the fire extinguishing liquid 55 (see FIG. 8) smoothly flows into the pack case 200 through the fire extinguishing liquid guide hole 250.

Moreover, it is also possible that the bottom surface 312 of the cover plate 310 is coated with a conductive paint to be grounded to the ground track 270, instead of the noise shielding member 390 made of a conductive sheet, so that the electromagnetic noise entering the pack case 200 through the fire extinguishing liquid guide hole 250 may be shielded.

Hereinafter, a process of guiding a fire extinguishing liquid into the battery pack 10 when a fire or overheating occurs at the battery pack 10 configured as above will be described in detail.

Figure 8:
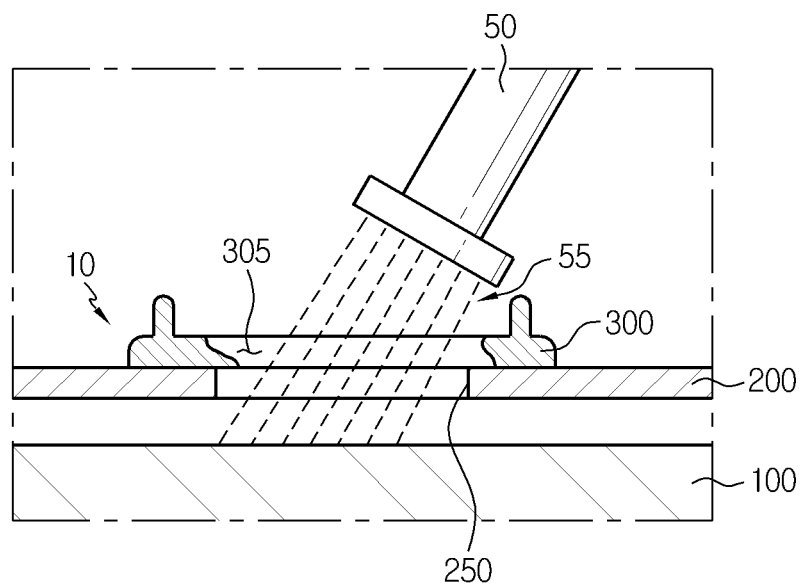
FIG. 8 is a diagram for illustrating how to guide the fire extinguishing liquid into the battery pack when a fire or overheating occurs at the battery pack of FIG. 1.

FIG. 8 is a diagram for illustrating how to guide the fire extinguishing liquid into the battery pack when a fire or overheating occurs at the battery pack of FIG. 1.

Referring to FIG. 8, when a fire or overheating occurs at the battery pack 10, the battery pack 10 may be expanded or exploded due to the overheating and the increased inner pressure of the battery module 100 packaged in the pack case 200.

The fire extinguishing liquid guide cover 300 of this embodiment may be melted at a high temperature to form a predetermined opening 305 when a fire or overheating occurs. The predetermined opening 305 may allow the fire extimzuishing, liquid guide hole 250 provided at the pack case 200 to be exposed out.

Accordingly, the battery pack 10 of this embodiment may preferentially reduce the risk of expansion and explosion of the battery module 100 caused by the increased inner pressure of the pack case 200, when a fire or overheating occurs at the battery pack 10.

In addition, the battery pack 10 of this embodiment may allow the fire extinguishing liquid 55 such as a fire extinguishing water injected from the extinguishing device 50 such as an extinguisher for suppressing the fire of the battery pack 10 to directly and smoothly flow into the pack case 200 through the predetermined opening 305 and the fire extinguishing liquid guide hole 250.

Accordingly, in this embodiment, since the fire extinguishing liquid 55 may be directly injected to the overheated battery module 100 through the predetermined opening 305 and the fire extinguishing liquid guide hole 250, the fire or the like may be suppressed more fast.

Thus, in this embodiment, it is possible to minimize a structure such as a vehicle to which the battery pack 10 is mounted is damaged due to a fire or the like, and thus it is also possible to minimize damage for humans caused therefrom.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery pack, comprising:
    a battery module having at least one battery cell;
    a pack case made of a metal material and configured to package the battery module a fire extinguishing liquid guide hole formed at one side of the pack case; and
    a fire extinguishing liquid guide cover configured to cover one side of the pack case, the fire extinguishing liquid guide cover being melted over a predetermined temperature to form an opening so that a fire extinguishing liquid is guided into the pack case, the fire extinguishing liquid guide cover comprising:
    a cover plate configured to cover the fire extinguishing liquid guide hole, the cover plate preventing the entry of liquid and melted over the predetermined temperature so that the fire extinguishing liquid guide hole is exposed; and
    an electromagnetic noise shield configured to cover the fire extinguishing liquid guide hole, the electromagnetic noise shield having apertures and preventing electromagnetic noise from entering the pack case.

2. The battery pack according to claim 1, wherein the electromagnetic noise shield is provided at a bottom surface of the cover plate and disposed at an upper side of the fire extinguishing liquid guide hole.

3. The battery pack according to claim 2, wherein the electromagnetic noise shield is made of a metal material and grounded to the pack case.

4. The battery pack according to claim 3, wherein the electromagnetic noise shield includes:
    a grounding portion configured to surround the fire extinguishing liquid guide hole and grounded to the pack case; and
    a shielding grid connected to the grounding portion and having a plurality of shielding holes disposed over the fire extinguishing liquid guide hole.

5. The battery pack according to claim 4, wherein at least one ground guide is provided at the grounding portion to facilitate easier grounding to the pack case.

6. The battery pack according to claim 5, wherein the ground guide includes a plurality of leaf springs, and
    wherein the plurality of leaf springs are disposed at predetermined intervals along a circumferential direction of the grounding portion.

7. The battery pack according to claim 4, wherein the plurality of shielding holes have a honeycomb shape.

8. The battery pack according to claim 2, wherein the electromagnetic noise shield is a conductive sheet.

9. The battery pack according to claim 1, wherein the cover plate is made of a plastic material.

10. The battery pack according to claim 1, wherein the fire extinguishing liquid guide cover includes a sealing member provided along a rim of a bottom surface of the cover plate.

11. The battery pack according to claim 1, wherein the fire extinguishing liquid guide cover includes a rigid reinforcing rib provided at a bottom surface of the cover plate.

12. The battery pack according to claim 1, wherein the fire extinguishing liquid guide cover includes a pressure filter mounted to an upper surface of the cover plate to allow an external air to flow in or out depending on the pressure in the pack case.

13. The battery pack according to claim 1, wherein the predetermined temperature is at least 100° C.

14. A vehicle, comprising a battery pack defined in claim 1.

15. The battery pack according to claim 1, wherein an outer edge of the electromagnetic noise shield is spaced inwardly of an outer edge of the cover plate.

16. The battery pack according to claim 15, further comprising a sealing member provided along a rim of a bottom surface of the cover plate, the sealing member being between the outer edge of the electromagnetic noise shield and the outer edge of the cover plate.

* * * * *